April 7, 1942. R. M. JONES 2,278,721
FLUID SEAL FOR PRESSURE VESSELS
Filed Jan. 16, 1941 2 Sheets-Sheet 2
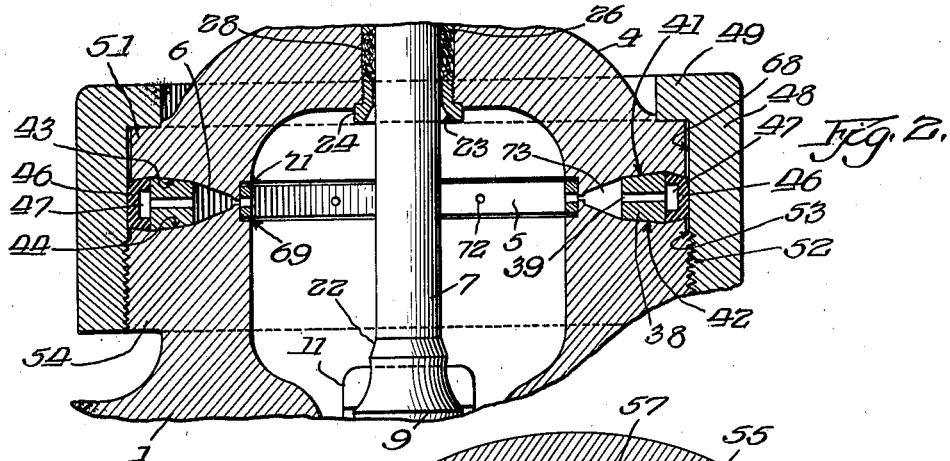
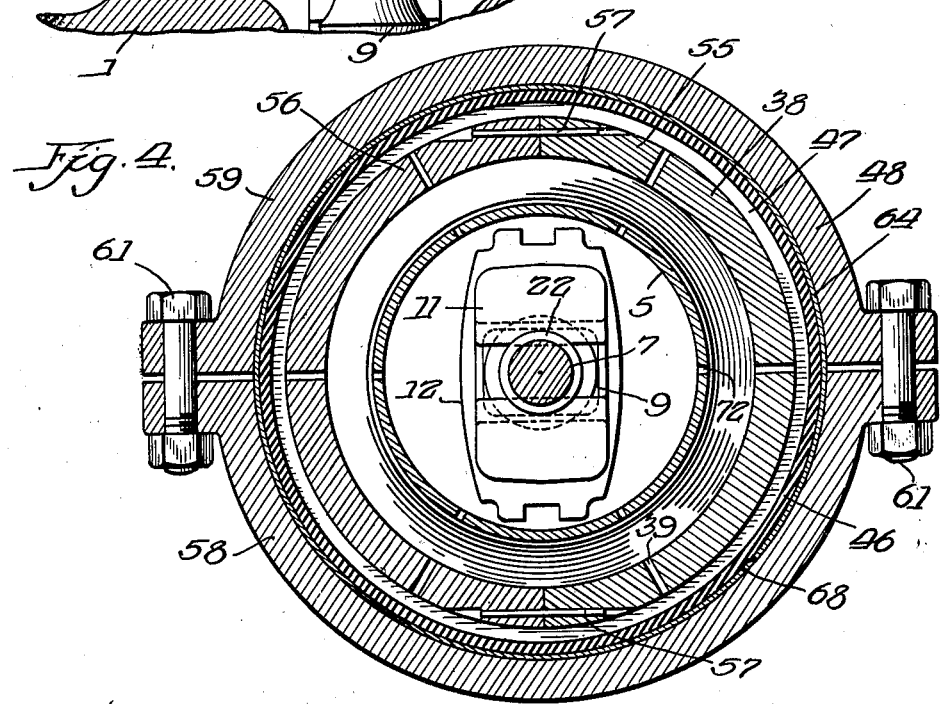
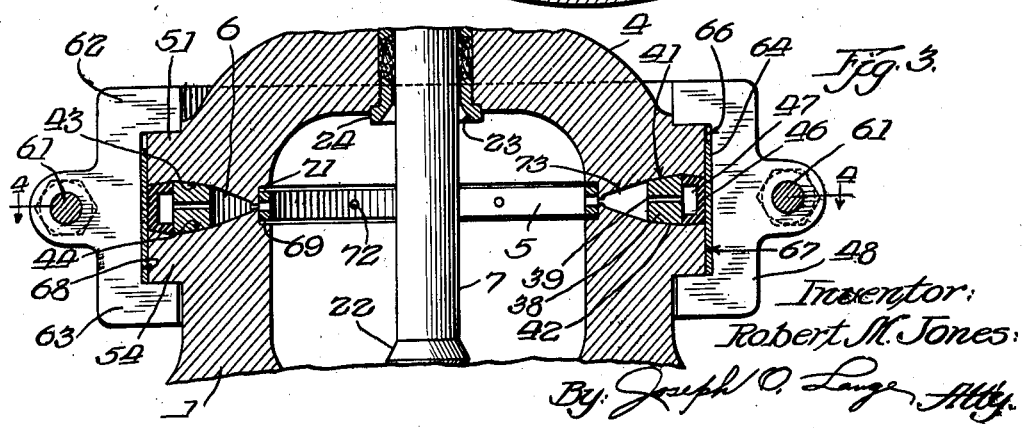
Inventor:
Robert M. Jones Patented Apr. 7, 1942

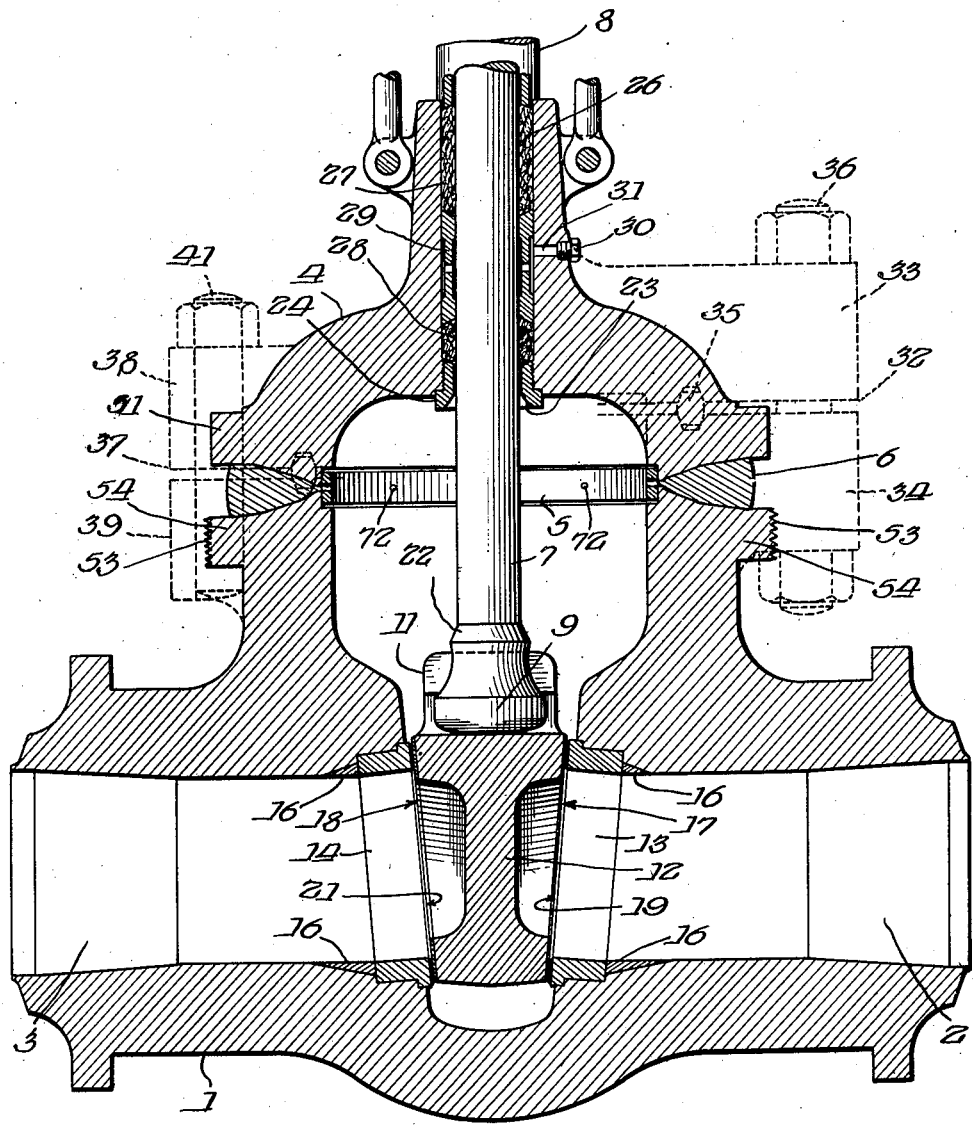

2,278,721

UNITED STATES PATENT OFFICE 2,278,721

FLUID SEAL FOR PRESSURE VESSELS

Robert M. Jones, Chicago, Ill., assignor to Crane Co., Chicago, Ill., a corporation of Illinois Application January 16, 1941, Serial No. 374,608

3 Claims. (Cl. 285—129)

My invention relates to improved means for and method of hydrostatic pressure-testing of valves, lengths of pipe and the like, and is particularly directed to a simple, convenient and economical device for rendering the bonnet-body joint of welded-bonnet valves pressure-tight during the application of fluid pressure within the valve in the process of testing.

In the manufacture of welded-bonnet valves, for instance, it is necessary to give the valve structure a pressure test for checking freedom from possible casting defects and the like before the final and permanent assembly thereof by welding. For this purpose it is necessary to provide means for removably mounting the bonnet onto the body and for sealing the body-bonnet joint while so mounted. Heretofore, it has generally been the practice to hold the two parts together by means of C-formed clamps arranged in predetermined relation peripherally about the joint. The latter practice entails a tedious and awkward process due to the necessity of separately mounting and de-mounting each clamp. It has also been a dangerous procedure where high test pressures are required due to the possibility that such clamps under the influence of line pressure may suddenly be dislodged to the extent of severely injuring workmen. The possibility of the clamps slipping off is especially present in welded bonnet valves, too, because the only grip generally provided for the clamps is a relatively narrow ledge or flange on each side of the joint. Despite these objections, however, the method has been widely used in the past because the test pressure requirements seldom exceeded a few hundred pounds per square inch or else because of the general availability of C clamps.

For today's exacting requirements, however, pipe and pipe fittings, such as valves, must be constructed to withstand thousands of pounds of pressure per square inch, instead of mere hundreds, and testing devices for these valves must usually withstand even several times these tremendous pressures. It is often the case that in pressure-testing large, high pressure, welded-bonnet valves or welded end pipe it is physically impossible to arrange for a sufficient number of C clamps about the body-bonnet joint to hold them together tightly with any degree of certainty or safety when subjected to the test pressures. For instance, a 12″ welded-bonnet gate valve constructed for continuous service on 2500 pounds per square inch steam must be tested on cold water at a pressure of 7200 pounds per square inch. Since this pressure may act on an area exceeding 240 square inches, there is a force exceeding 1,400,000 pounds or 700 tons tending to separate the bonnet and body. Obviously the test joint employed must be sufficiently sturdy to withstand an exceptionally high load safely.

A primary object of my invention, therefore, lies in the provision of means for temporarily assembling a welded-bonnet valve or a pair of pipe sections or the like for mounting in a safe manner and with a positively leak-proof joint for the purpose of pressure testing the valve or pipe when so assembled.

Another object of my invention lies in the provision of a joint for testing a valve or the like in which the fluid pressure within the valve operates to seal the joint.

A still further object is the provision of a novel joint between the body and the bonnet of a welded-bonnet valve or between pipe sections in combination with suitable annular back-up and clamping rings for the purpose of testing such a valve or pipe for pressure-retaining ability prior to permanently welding the joint.

Other objects and advantages will appear from the following detailed descriptions which are to be considered in connection with the accompanying drawings, in which Fig. 1 is a vertical sectional view of a welded-bonnet gate valve with the parts immediately above the bonnet not shown and with the bonnet shown as being welded permanently to the body.

Fig. 2 is a fragmentary vertical sectional view showing my invention as it would be applied, before welding, to the valve shown in Fig. 1.

Fig. 3 is a view similar to Fig. 2 showing another modification of my invention.

Fig. 4 is a sectional view taken on the line 4—4 of Fig. 2.

Like reference numerals refer to like parts throughout the various views of the drawings.

Referring to Fig. 1, I have chosen a valve for illustrative purposes only in connection with my present invention, this type of valve being known to those skilled in the art as a welded-bonnet gate valve. The valve comprises the usual parts consisting of a body or casing 1 having ports or passages 2 and 3 provided with means for connecting into a pipeline, as for instance with the welding ends shown, a bonnet 4 secured to the casing 1 by means of the welded joint 6, a stem 7 reciprocably mounted within the bonnet 4 and operatively connected at its upper end to a handwheel (not shown) and the yoke 8 (partially shown). The back-up ring 5 prevents the dripping of molten metal within the bonnet 4 during welding and is also used to center the body and bonnet or to properly align these two parts. The lowermost end of the stem 7 is provided with a T head 9 for engagement with jaws or hook portions 11 of the solid wedge disc or closure member 12, the latter member adapted to contact the seats 13 and 14 (as shown) for the purpose of stopping the flow of fluid through the valve. The seats 13 and 14 as shown are preferably joined to the casing 1 by means of weld metal laid into the casing at 16 but may be fastened in any other manner as by screw threads, brazing, or even may be integral with the casing 1. The seating surfaces 17 and 18 of the disc 12 and the seating surfaces 19 and 21 of the seats 13 and 14 are shown as a hard, wear-resistant layer over softer tougher relatively less wear-resistant base materials. The stem 7 is provided with a frusto-conical back-seating surface 22 which contacts a similarly shaped surface 23 in the back-seating bushing 24 when the stem 7 is drawn upward to the limit of its travel, thereby sealing off the packing chamber generally designated 26 from the fluid within the valve, allowing the packing 27 or 28 or the packing spacer 29 to be replaced or repaired without taking the valve from service. In the event that the back-seating surfaces 22 and 24 allow some fluid to leak into the packing chamber 26, the opening 31 is provided with the screwed plug 30 for the purpose of relieving or draining any fluid that leaks in while repairs are being made in the packing chamber 26.

The structure generally designated 32 shown in broken lines at the right in Fig. 1 illustrates how much more bulky the valve would be if the bonnet and body were constructed with flanges 33 and 34, respectively, which are clamped tightly down on the sealing ring 35 by means of through-bolts 36. The flanged structure at the left in Fig. 1 generally designated 37, likewise illustrates how much more bulky the valve would be if the bonnet and body were constructed with flanges 38 and 39, respectively, connected by means of stud-bolts 41. The use of welded-bonnet valves, from these illustrations, means a very real saving in weight and consequently in first cost. For instance, a 12" welded-bonnet valve such as illustrated in Fig. 1 and rated for 2500 pounds per square inch steam service is approximately 2500 pounds lighter than if provided with the flanged and bolted joint 32. (The repetition of "2500" is merely coincidental.) Due to this advantage of welded-bonnet valves, these types have been more and more in demand by users of high pressure fluid lines thus making a greater need for such a simple, practical and safe means as I have devised for testing these valves during the course of manufacture.

As previously stated, valves with welded-bonnet joints must be pressure tested before the joint is finally welded. Fig. 2 illustrates a preferred form of my invention as applied to the body-bonnet joint of such a valve as shown in Fig. 1. For convenience of description, my invention so illustrated may be divided into three cooperating parts: first, the gasket back-up ring, generally 38, having a number of radial apertures 39, the faces 41 and 42 of the ring formed at such an angle with respect to the axis of the ring that they normally conform substantially flatwise with the surfaces 43 and 44 of the bonnet and body respectively; second, a substantially U-shaped annular gasket 46 in concentric abutment with the ring 38, with the hollow side of the U extending inwardly and forming the chamber 47 between the back-up ring and the gasket; and third, a ring, generally designated 48, having at its upper end an inwardly extending flange portion 49 adapted to interlock with the outwardly extending flange 51 on the bonnet, the ring 48 having at its lower end portion the inside threads 52 which are screwed onto the threads 53 of the body flange 54.

The ring 38 is preferably of metal but could be constructed of a plastics material such as phenol formaldehyde resin, or even of wood; as shown in Fig. 2, it is made in one piece but, to facilitate its removal, it may advantageously be made in two or more portions such as illustrated in Fig. 4 where it comprises a pair of semi-circular rings 55 and 56 jointed separably together as by means of dowel pins 57.

The gasket 46 is preferably made of some rubber-like or other resilient material capable of forming a pressure-tight seal when the chamber 47 between the ring 38 and the gasket 46 is filled with fluid under pressure. Any gasket constructed to function in this manner may be employed as, for instance, a C-shaped gasket.

Due to the high strength required of the ring 48 to hold the body and bonnet together when test pressures are applied, it will usually be made of metal, preferably steel. It may be constructed in one piece and screwed onto the body as in Fig. 2; or it may be made in two semi-circular parts 58 and 59 of U-shaped cross-section as shown in Figs. 3 and 4 and held normally together as by bolts 61, the inwardly extending flanges 62 and 63 interlocking with the bonnet and body flanges 51 and 54 and serving thereby to restrain separation of the bonnet from the body when pressure is applied within the valve.

In Fig. 3 an extra ring 64 is shown interposed between the outside cylindrical surfaces 66 and 67 of the bonnet and body flanges and the inside surfaces 68 of the ring halves 58 and 59. The ring 64 may or may not be used, as desired, and its chief purpose is to act as a retaining ring for purpose of providing a continuous back-up, or support, for the resilient gasket ring 46.

To assemble the valve for a pressure test with my device the welding back-up ring 5 is first placed in the body in the circular groove 69, and the ring 38 is then laid in the welding groove with the lower surface 42 of the ring abutting the surface 44 in the welding groove. The rubber-like gasket 46 is mounted circumferentially about the gasket back-up ring 38 and then the bonnet with the stem and disc suspended from it is lowered onto the body so the welding back-up ring enters the groove 71 in the bonnet and the upper surface 41 of the gasket back-up ring comes into abutting unloaded contact with the surface 51 in the welding groove in the bonnet. The weight of the bonnet 4 is normally carried by the ring 5 when there is no pressure within the valve. The ring 48 is then applied by screwing on the unitary piece as in Fig. 2, or by bolting the two halves together over the bonnet and body flanges 51 and 54 as in Figs. 3 and 4. After the ports 2 and 3 are closed in some suitable manner as, for instance, by means such as described for the bonnet-body joint, it is ready for the application of test pressure.

When test pressure is applied within the valve, the radial apertures 72 admit the pressure into the chamber 73 at base of the welding groove. From there the radial openings 39 in the gasket back-up ring 38 admit the pressure into the annular chamber 47 between the gasket and the gasket back-up ring. The pressure within the chamber presses the resilient gasket 46 upwardly, outwardly, and downwardly, into fluid sealing abutment with the lower surface 43 of the bonnet, the inner surface 68 of the ring 48, and the upper surface 44 of the body, respectively. The gasket back-up ring 38 prevents the gasket 46 from squeezing or flowing inwardly along the surfaces 43 and 44 under the influence of the test pressure.

The alternative constructions which I have disclosed in which the gasket back-up ring 38 and the outside ring 48 are each made in two pieces, especially facilitate disassembly after testing, for in some cases, as with very heavy valves having bulky, awkward-handling bonnets, it is a laborious process to lift the bonnet completely from the body merely to remove the ring 38 preparatory to welding. If the back-up ring 38 is made in two pieces and doweled together as in Fig. 4, its removal is much simplified for use with heavy valves. In such a case the welding ring 5 may be constructed to bear the entire weight of the bonnet assembly as previously stated and, when the outside ring 48 is removed (or the ring combination of halves 58 and 59 is removed) and the gasket 46 is taken out by stretching or cutting, the two halves 55 and 56 of the gasket back-up ring may be separated parallel to the dowel pins 57 and removed without disturbing the position of the bonnet on the body. In the subsequent permanent joining of the bonnet to the body by welding the openings 72 will be substantially plugged with weld metal.

It is obvious that a detailed construction describing a preferred embodiment of my invention has been illustrated, and that numerous modifications may be made within its scope. While I have illustrated my invention as it may chiefly be applied in the testing of hollow pressure vessels, it should be obvious in the light of the disclosures herein that in some instances my device may advantageously be incorporated into the finished product, for instance, in valves, fittings, pipe, etc., designed for high pressures but relatively low temperature service. I desire, therefore, to be limited only to the appended claims.

I claim:

1. Joint means for pressure vessels, comprising an annular pressure-sealing gasket of expandible material positioned within an outwardly tapered circumferential groove common to a pair of abutting sections of said pressure vessel, removable rings having radially extending apertures respectively positioned concentrically within said gasket, said rings adapted to restrain radial deformation of said gasket under the influence of internally applied fluid pressure, the outer of said rings being wedge shaped in cross-section and cooperating in interlocking relation with said joined sections of said pressure vessel whereby said sections are maintained in predetermined spaced-apart relation, and the inner of said rings acts to align the pair of abutting sections of said pressure vessel.

2. A pressure-retaining joint comprising abutting flanged substantially circular end portions of separate parts of a vessel adapted to retain fluid under pressure, comprising a segmented channeled ring adapted to encircle and interlock said abutting flanged end portions, a pressure-actuated fluid-sealing gasket of substantially U-shaped cross-section interposed between said channeled ring and said vessel and positioned within a wedge shaped circumferential relieved portion common to said end portions of said vessel, a segmented wedge shaped supporting ring having radially extending apertures for said gasket positioned concentrically interiorly thereof within the similarly wedge shaped relieved portion.

3. A combined fluid coupling comprising a circumferential outwardly tapered groove common to said adjoining sections, an outwardly extending flange adjacent the joined end portions of said pressure vessel sections, a pressure-actuated gasket and a removable tapered back-up ring therefor positioned within said groove and said tapered surfaces coinciding, a removable segmented channel-shaped collar adapted to clamp said flanges together, a continuous ring positioned within the inner periphery of said channel-shaped collar said ring being interposed between the collar and the outside peripheries of said flanges, whereby the said gasket is forced into fluid-sealing peripheral contact with said continuous ring upon the application of line pressure within the said vessel.

ROBERT M. JONES.